(12) United States Patent
Hollerback

(10) Patent No.: US 8,393,362 B1
(45) Date of Patent: Mar. 12, 2013

(54) AUTOMATED VEHICLE FUELING APPARATUS AND METHOD

(76) Inventor: James A. Hollerback, Bay City, MI (US)

( * ) Notice: Subject to any disclaimer, the term of this patent is extended or adjusted under 35 U.S.C. 154(b) by 0 days.

(21) Appl. No.: 13/018,065

(22) Filed: Jan. 31, 2011

Related U.S. Application Data

(60) Provisional application No. 61/299,934, filed on Jan. 30, 2010.

(51) Int. Cl.
*B65B 31/00* (2006.01)

(52) U.S. Cl. ............ 141/94; 141/98; 141/192; 414/730; 700/245

(58) Field of Classification Search .................. 141/94, 141/98, 192, 231, 232, 382; 901/16, 41; 700/245, 259; 414/730; 74/490.06
See application file for complete search history.

(56) References Cited

U.S. PATENT DOCUMENTS

| | | | | |
|---|---|---|---|---|
| 3,642,036 A | * | 2/1972 | Ginsburgh et al. | 141/94 |
| 4,432,063 A | * | 2/1984 | Resnick | 700/250 |
| 4,780,047 A | * | 10/1988 | Holt et al. | 414/730 |
| 4,881,581 A | * | 11/1989 | Hollerback | 141/113 |
| 5,609,190 A | * | 3/1997 | Anderson et al. | 141/59 |
| 6,237,647 B1 | * | 5/2001 | Pong et al. | 141/94 |
| 6,382,269 B1 | * | 5/2002 | Tatsuno | 141/94 |
| 6,431,226 B1 | * | 8/2002 | Koslowsky | 141/98 |

* cited by examiner

*Primary Examiner* — Timothy L Maust
*Assistant Examiner* — Timothy Kelly
(74) *Attorney, Agent, or Firm* — Robert L. Farris; Farris Law, P.C.

(57) ABSTRACT

A multi axis robot is mounted in a fuel transfer housing. A programmable controller is connected to the robot. A control console receives instructions, from a vehicle operator who remains in an operator's station, and transmits instructions to the controller. Cameras locate the vehicle fueling port. A tube is extended from the transfer housing toward the fueling port. The port is opened by robot arm and tools extending through the tube. The cap is stored. A fuel discharge is connected to the port. A fuel pump is activated and then deactivated. The fuel discharge is removed from the port. The robot retrieves the fuel cap, closes the port and closes other port covers. The tube is retracted into the transfer housing. During fueling air and fuel vapors are sucked into the housing. Filters separate air. Captured fuel is returned to storage. The operator and vehicle separate from the fuel housing.

15 Claims, 11 Drawing Sheets

AUTOMATED VEHICLE FUELING APPARATUS AND METHOD

CROSS REFERENCE TO RELATED APPLICATION

This application claims the benefit of the filing date of U.S. Provisional Application No. 61/299,934 titled AUTOMATIC GROUND REFUELING USING A TELESCOPING PLENUM filed Jan. 30, 2010.

TECHNICAL FIELD

The invention is in an apparatus for fueling and defueling vehicles, capturing fuel vapors from the vehicle and fuel storage tank, and a method of operating the apparatus.

BACKGROUND OF THE INVENTION

Apparatus has been used for automated fueling of land vehicles. All of these land vehicles were modified to have a special fueling port in one specific location on the vehicle. One wheel of the vehicle was locked in a predetermined location during fueling. Fuel spilled during vehicle filling was received in a sump. Vapors from the vehicle tank were not captured. Vapors from the fuel in the sump were not captured. The apparatus was not able to defuel the vehicle tank. Errors in positioning of the vehicle and positioning of the fuel supply tube relative to the fuel receiving aperture on the vehicle were difficult to control.

SUMMARY OF THE INVENTION

Zero tolerance emissions capturing the underground or above ground vapors, vapors from the nozzle connection, also fugitive vapors, claiming up to 99% of all vapors are VOC (Volatile Organic Compounds). All vapors travel through a filtering and separation pumping station that the liquid travels to the storage tank and the vapors are separated and vented as clean air to the atmosphere.

Carbon credits possible on a carbon exchange with zero tolerance emissions.

Ultra high delivery speed is possible, greatly exceeding current 10 gpm for gasoline and 28-38 gpm for diesel fuel.

For the federal government, this is a shovel ready green project.

We can use virtually and practically any known nozzle on the market today, especially commercial high speed nozzles.

Telescoping plenum allows most vapors a time and place to be captured. A on the market filter system for all vapors will obsolete the clumsiness and time consuming efforts of both Stage 1 and Stage 2 vapor recovery.

The ORVR (On board Refueling for Vapor Recovery) is reported to capture up to 95% of refueling vapors on cars using gasoline. Our system captures up to 99% of the remaining vapors to give a zero tolerance vapor emissions system.

For diesel fuel, there is a reformer system that uses Urea on mostly Class 8 trucks to capture the Total Aromatic Hydrocarbons (TAH). This technology is called REF. We can capture up to 99% of TAH.

We can defuel a gasoline tank of a vehicle. When a wholesaler wants to sell a car on auction, only 3 gallons of fuel are needed. With a million cars, trading in at an 15 gallons in the tank equals $45 million dollars in wasted fuel. Turning a car in with 3 gallons of fuel at $3.00 per gallon is only $9 million dollars, giving a $36 million dollars in fuel or enough to buy 1800 new cars at $20 thousand dollars each. The same scenario is true for diesel fuel only larger numbers. Diesel fuel can be drained easily while gasoline cannot.

We are using an additive that treats the ultra low sulfur diesel fuel prevents foaming at high speeds of refueling. The fuel doesn't foam in the fuel chambers and burns better giving a cleaner engine and more miles per gallon in fuel economy. For our purposes without the additive the foam would shut off the venturi.

Physically challenged, mothers with small children, elderly people, and others would never have to leave their seat to refuel their vehicles.

Stronger formulas of gasoline can be blended without fear of damage to human eyes, ears, nose, throat, skin or lungs.

Diesel fuel spills and TAH are slippery and dangerous for humans walking around refueling trucks. A robot saves humans and attendants from accidents and keeps them out of other human's way.

DETAILED DESCRIPTION OF THE PREFERRED EMBODIMENTS

Figure 1:
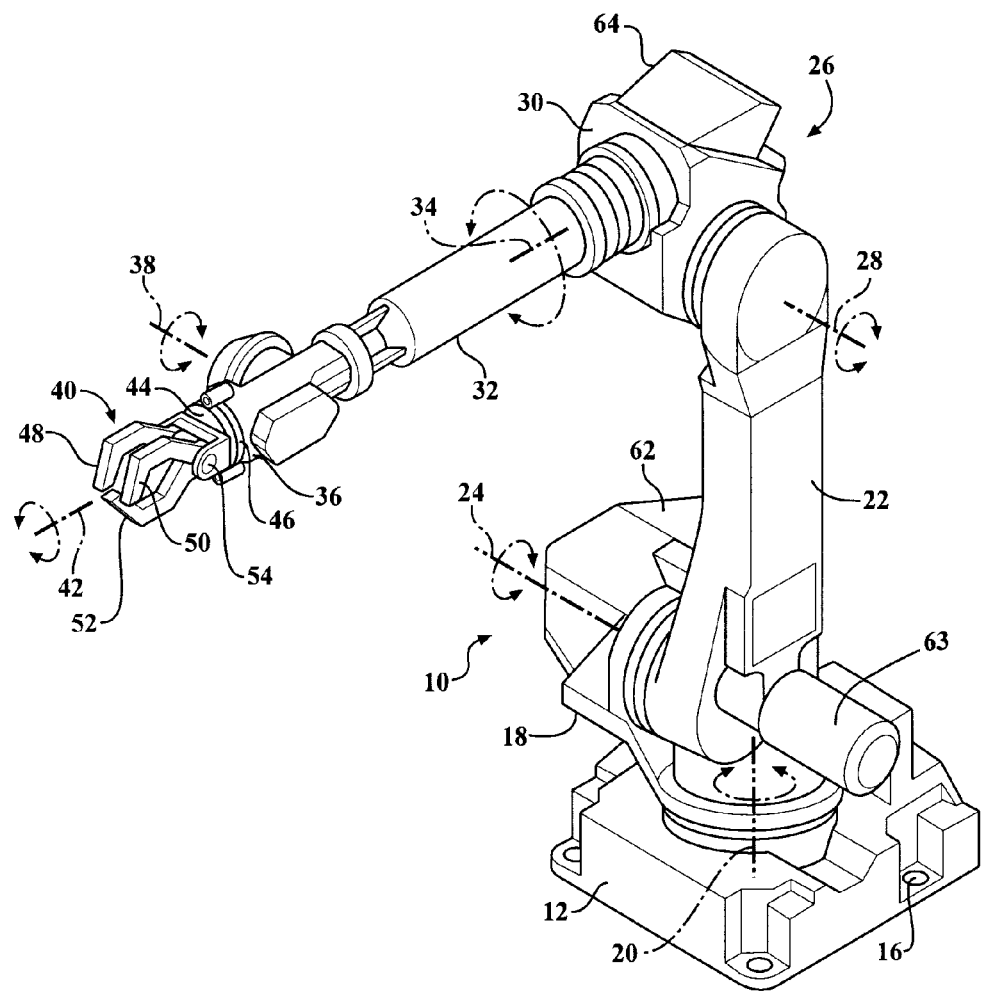
FIG. 1 is a perspective view of a six axis robot.
Figure 2:
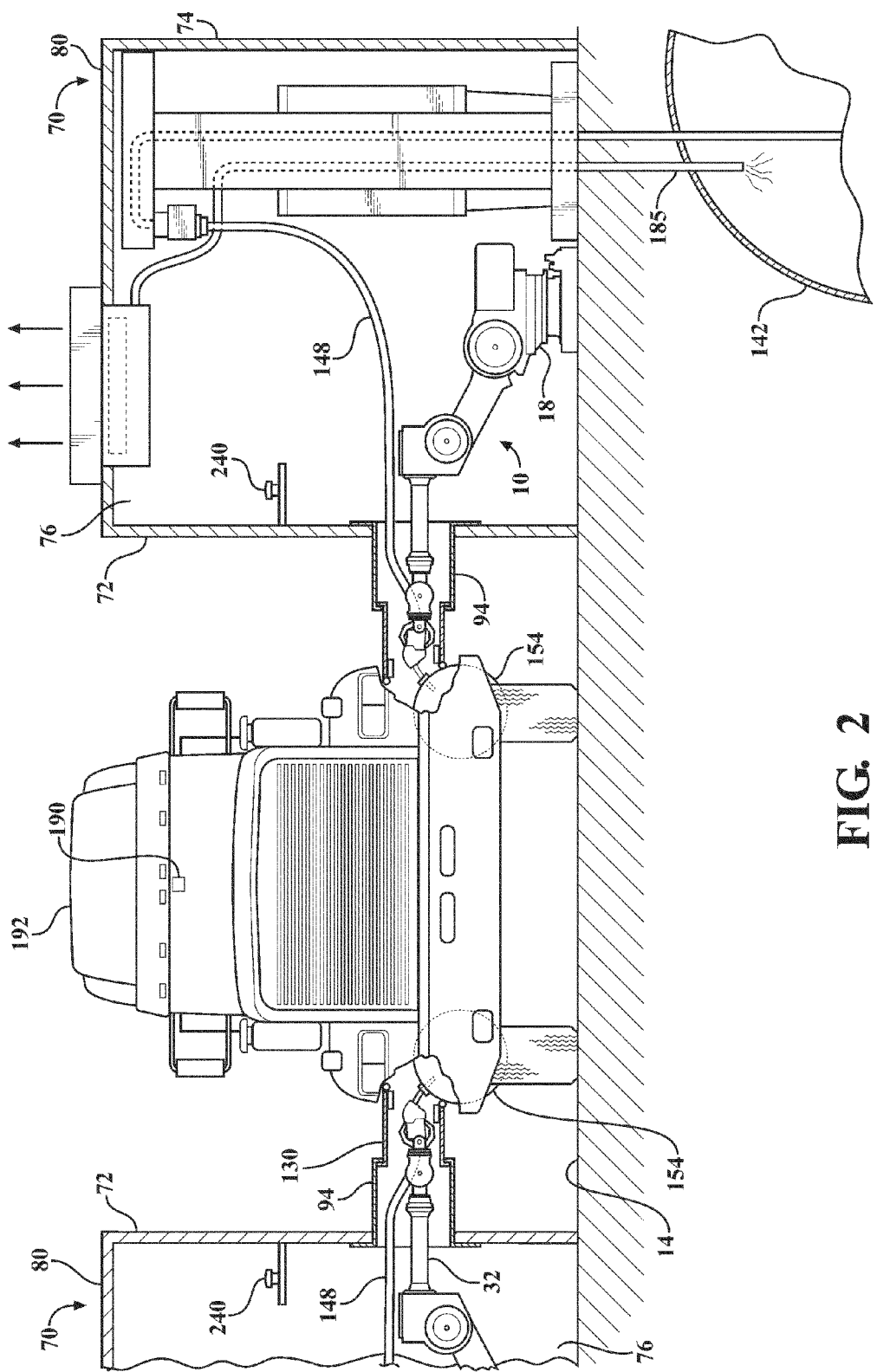
FIG. 2 is a front elevational view, with parts broken away showing simultaneous filling of two truck tanks with diesel fuel.
Figure 3:
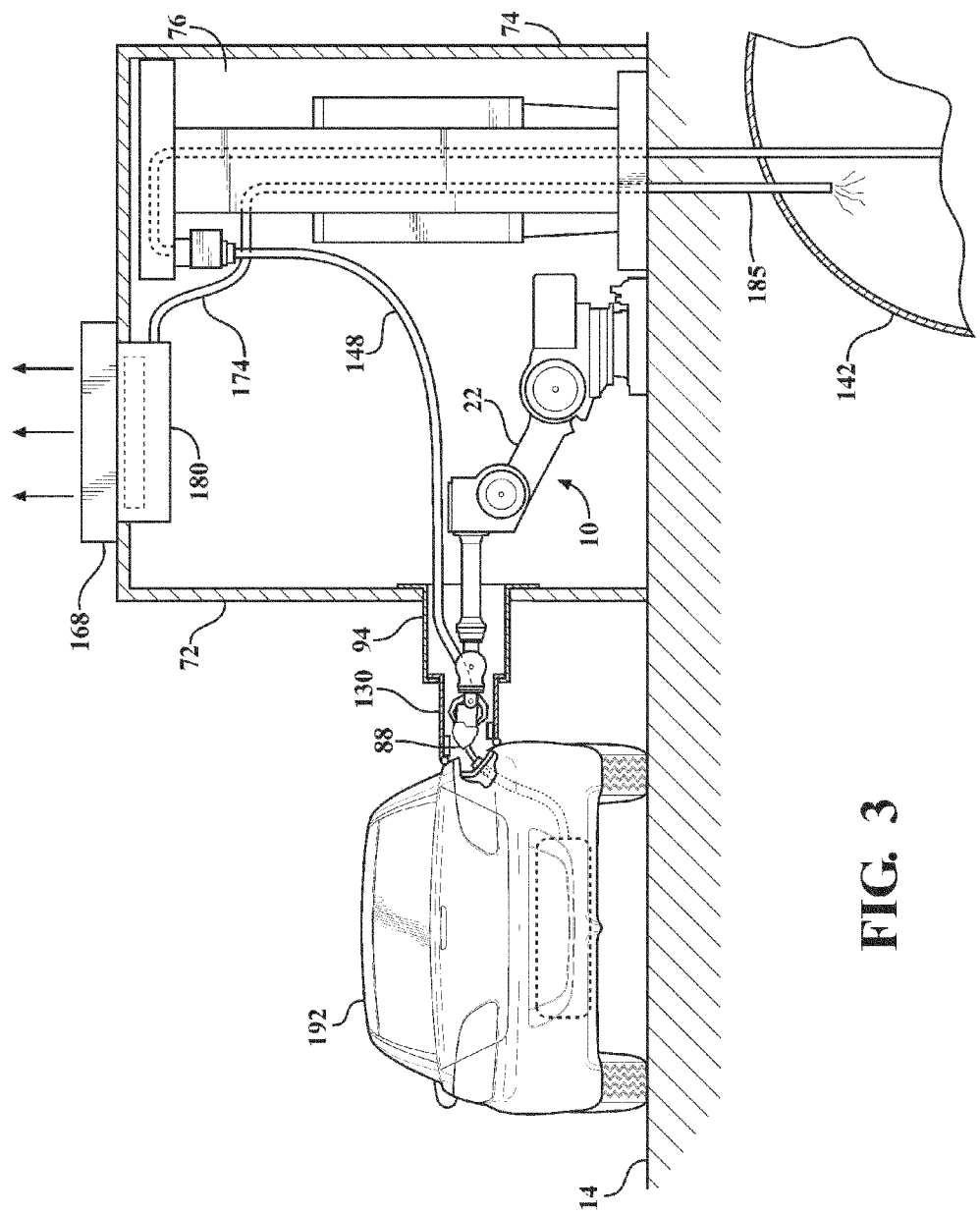
FIG. 3 is a front elevational view of an automobile being fueled.
Figure 4:
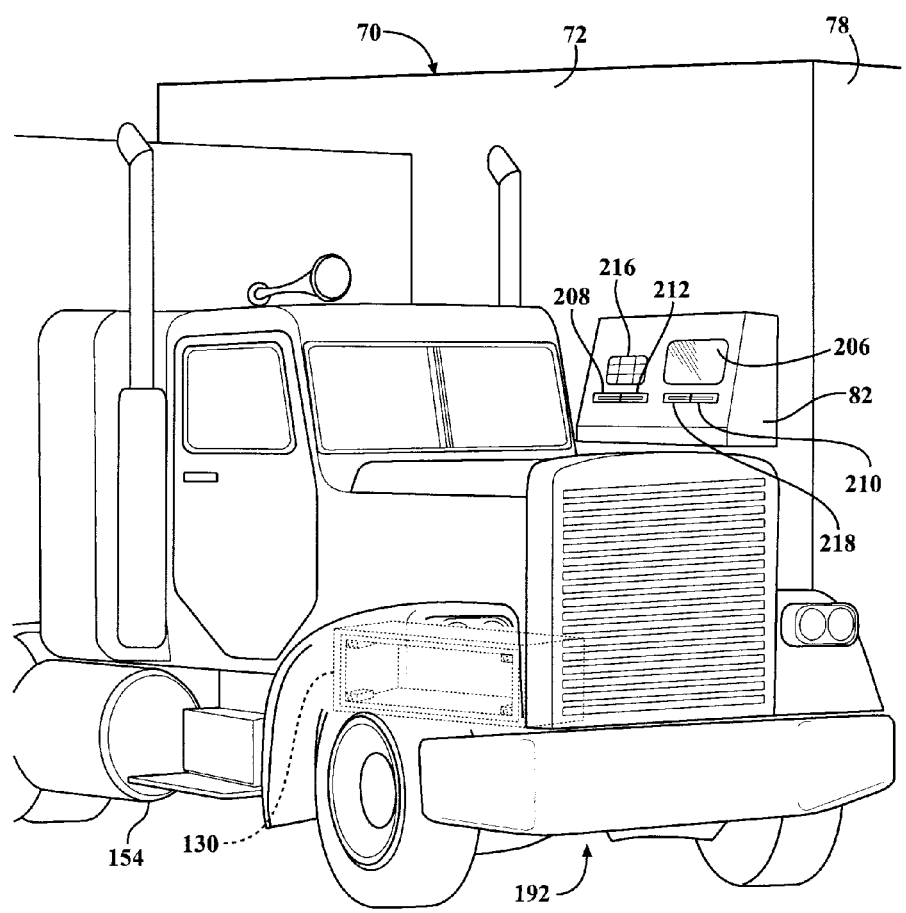
FIG. 4 is a perspective view of a truck in a fueling bay adjacent to a control console.

The robot 10, as shown in FIG. 1, includes a fixed robot base 12. The base 12 is clamped to a concrete slab 14 by bolts embedded in the slab and passing through bores 16 through the base. A pivotable base 18 is journaled on the fixed robot base 12 for pivotal movement about a base axis 20. A first arm 22 is pivotally attached to the pivotable base 18. The first arm 22 pivots about a first arm axis 24 which is perpendicular to the base axis 20. A second arm assembly 26 is pivotably attached to the first arm 22 for pivotal movement about a second arm axis 28. The second arm axis 28 is parallel to the first arm axis 24.

The second arm assembly 26 includes a second arm elbow housing 30 that is journaled on the first arm 22. An elongated second arm portion 32 is pivotally attached to the elbow housing 30. The elongated second arm portion 32 pivots about an elongated second arm portion axis 34. The elongated second arm axis 34 is transverse to and offset from the second arm axis 28. A wrist portion 36 on the free end of the elongated second arm portion 32 is pivotable about a wrist axis 38. The wrist axis 38 is perpendicular to the elongated second arm axis 34.

A tool end assembly 40 is journaled on the wrist portion 32 for pivotal movement about a tool end axis 42. The tool end assembly plate member 44 is rotatable relative to the wrist plate 46. The tool end assembly 40, as shown in FIG. 1 is a grasping tool with two fingers 48 and 50 that pivot relative to single finger 52 about pivot pin 54.

The tool end assembly 40 is one of many tools each of which is designed to perform a specific function or functions. Tool end assembly 40 is removable and replaceable with another tool end assembly. These tool end assemblies are changeable automatically during operation to perform different tasks, if the robot is programmed to make a change.

The robot 10 described above is a FANUC ROBOTICS M710 model unit with six axes. The robot 10 is designed to operate in hostile environments, in which a human cannot work, during use of the robot. Movement of the robot 10 is controlled by a programmable controller 60 shown in FIG. 7. The controller 60 controls reversible electric motors that pivot members about at least six axes. An electric motor in housing 62 pivots the pivotal base 18 about the base axis 20. A motor 63 pivots the first arm 22 relative to the pivotable base 18. A motor inside elbow housing 30 pivots the second arm assembly 26 about the second arm axis 28. Three motors are under a cover 64. Each of the three motors is mounted on the elbow housing 30. One of the three motors pivots the elongated second arm portion 32 about axis 28. The second motor of the three motors under cover 64 pivots the wrist portion 36 about the wrist axis 38. The third motor under cover 64 pivots the tool end assembly 40 about the tool end axis 42. The tool end assembly 40 can be rotated about the tool end axis 42, in either direction, more than three hundred and sixty degrees. Pivotal movement about base axis 20, second arm axis 28, second arm portion axis 34 and wrist axis 38 in one direction is limited to no more than three hundred and sixty degrees in one direction. Pivotal movement about all six axes is coordinated by the programmable controller 60 to move the tool end assembly 40 from one position to the next scheduled position along the shortest allowable path in one smooth coordinated movement and ready to perform the next scheduled task.

Figure 7:
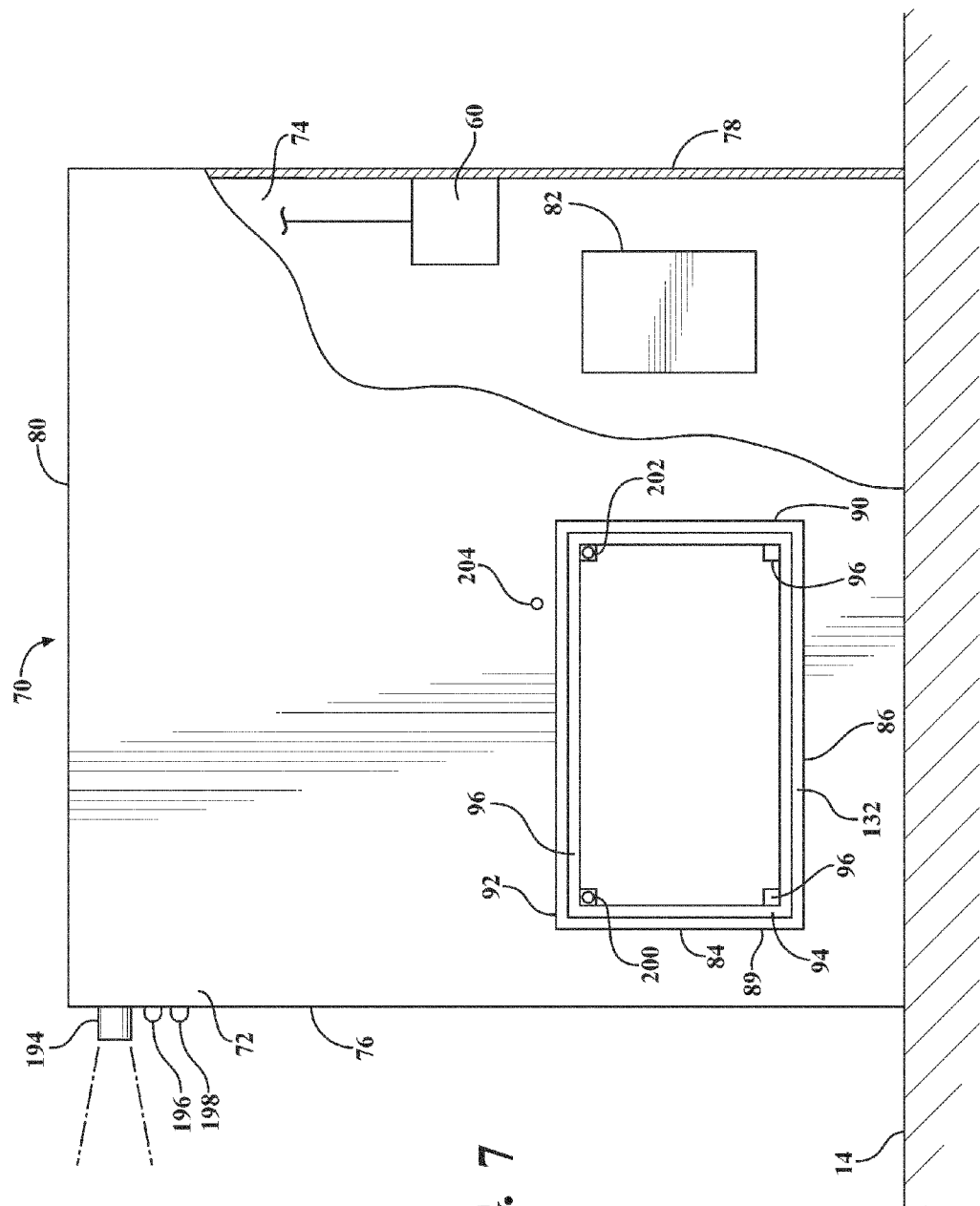
FIG. 7 is a modified side elevational view of a fuel transfer housing.

Fuel transfer housing 70, shown in FIG. 7, has a front wall 72, a rear wall 74, an entry end wall 76 an exit end wall 78, and a top panel 80. These walls 72, 74, 76, and 78 and the top panel 80 are preferably carbon fiber reinforced polyester material. The surfaces of the walls and top panel are smooth and slick for ease of cleaning and to minimize collection of contaminants. The entry end wall 76 may have an entry opening for maintenance and service activities. The exit end wall 78 may also have an entry opening for maintenance and service activities. These maintenance entry openings (not shown) are air tight when closed. A control console 82 is mounted in the front wall 72 adjacent to the exit end wall 78. The control console 82 should be at about the height of a vehicle driver's window on vehicles that are to receive fuel. A fuel transfer opening 84 is provided in the front wall 72. The fuel transfer opening 84 has a bottom edge 86 that is below the lowest vehicle fuel port 88 that is to be fueled. An entry end 89 of the fuel transfer opening 84 is positioned near the rear most vehicle fuel port 88 that is to be fueled when the vehicle driver's window is adjacent to the control console 82. An exit end 90 of the fuel transfer opening 84 is positioned near the forward most vehicle fuel port 88 that is to be fueled when the vehicle driver's window is adjacent to the control console 82. The upper edge 92 of the fuel transfer opening 84 is above the maximum height of the first arm 22 and the second arm assembly 26 of a robot 10 when fueling a vehicle with the highest vehicle fuel port 88.

The fuel transfer housing 70 for most personal passenger vehicles will have different dimensions than a fuel transfer housing for large commercial vehicles.

The fuel transfer housing 70 is mounted on the concrete slab 14. A seal is provided between the fuel transfer housing 70 and the concrete slab 14. A rectangular plenum tube 94 made from carbon fiber reinforced polyester material is slidably mounted in the fuel transfer opening 84 through the front wall 72 of the fuel transfer housing 70. The rectangular tube 94 is slightly smaller than the fuel transfer opening 84. Two beams 96 have ends that are received inside the rectangular tube 94 as shown in FIG. 7. The beams 96, inside the housing 70 are offset at 98 away from the robot 10, to provide additional space for the robot. Upper rollers 100 and lower rollers 102 are attached to beams 104 and 106 respectively. These beams 104 and 106 are attached to supports 108 and 110. Both supports 108 and 110 are anchored to the concrete slab 14. The rollers 100 and 102 support the beam 96 and permit the beam to move toward and away from the rear wall 74. The beam 96 on the opposite side of the robot 10 from the beam 96 shown in FIG. 9 with the exception of being rotated 180° so that the offset at 98 is away from the robot 10. The rollers 100 and 102 supporting the beams 96, on both sides of the robot 10 are substantially identical on both sides of the robot 10. The two sets of rollers 100 and 102 support both beams 96 as well as the rectangular plenum tube 94. Acme threaded screw threads 112 on rods 114 engage nuts 116 fixed to the beams 96. Motors 118 rotate the rods to advance and retract the beams 96 and the rectangular tube 94.

The open rectangular plenum tube 94 provides substantial space and room for the passage of the second beam assembly 26 of the robot 10 and possibly a portion of the first beam 22. The inside width of the rectangular plenum tube 94 permits a substantial pivotal movement of the pivotable base 18 to accommodate a large range of positions of a vehicle fuel port 88. However the area of the opening through the rectangular plenum tube 94 is relatively large and collection of fuel vapors requires increased air movement.

An auxiliary plenum tube 130 may be telescopically received in the rectangular plenum tube 94 that contacts the side of the vehicle creating at least a partial seal. Seal members 132 on the open end of the auxiliary plenum tube 130 may contact the vehicle side as shown in FIGS. 2, 3, 6 and 9 thereby making recovery of fuel vapors easier. The motors 118 can sense the increase force required to extend the rectangular tube 94 upon contact between the seals 132 and a vehicle and stop the motors 112.

Figure 9:
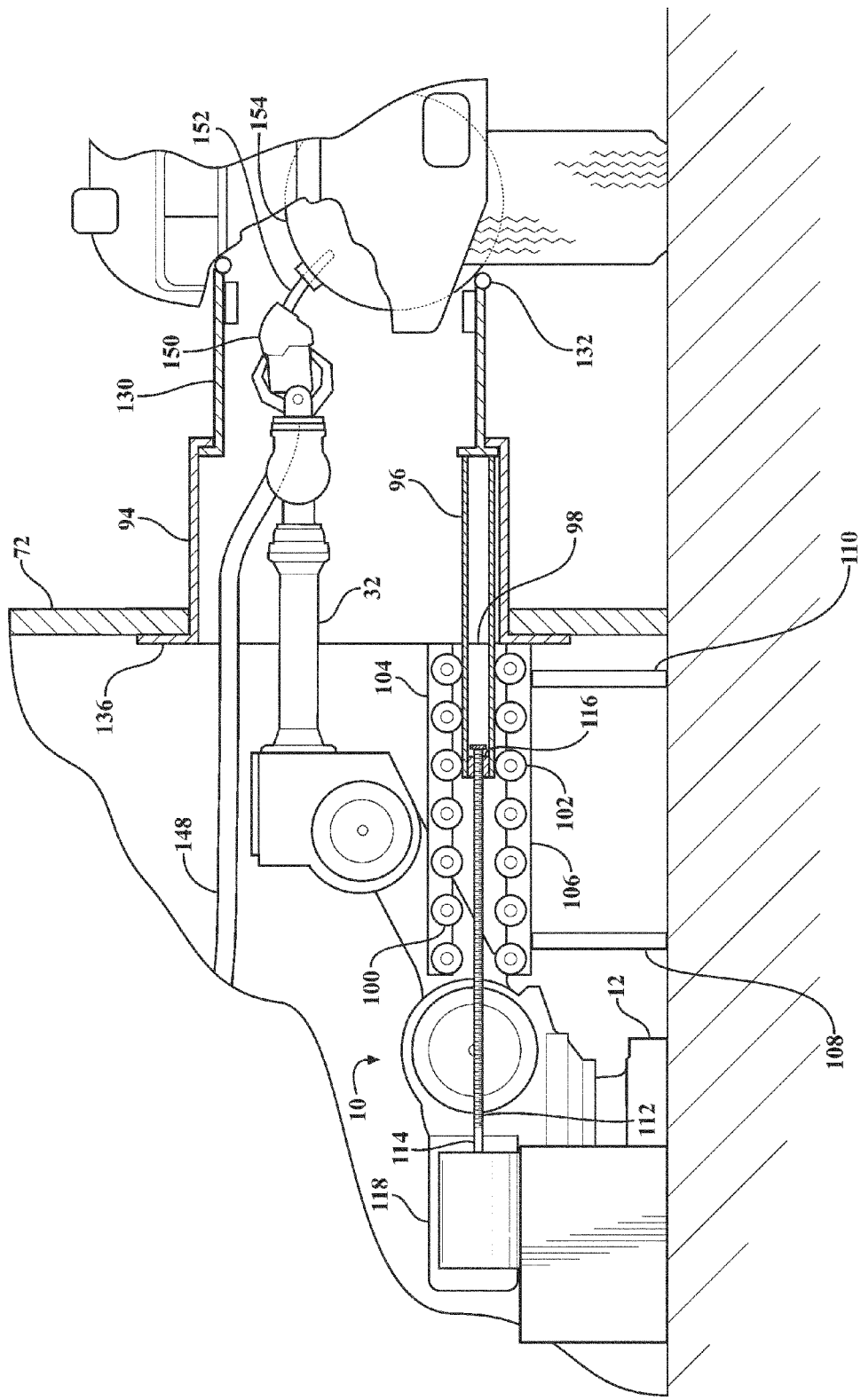
FIG. 9 is a sectional view of the fuel transfer housing showing the robot fueling a vehicle with parts broken away.
Figure 10:
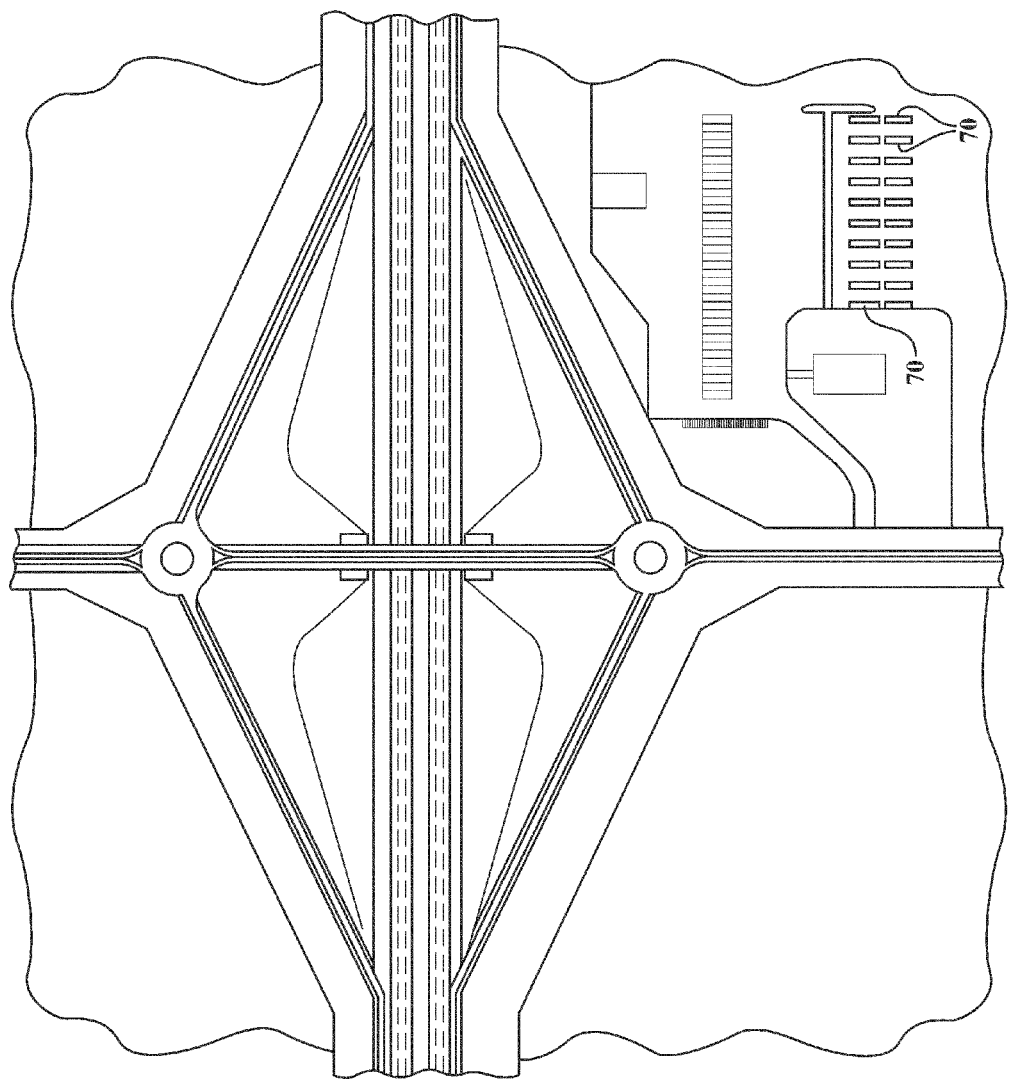
FIG. 10 shows a Highway spur plan view with nine fueling lanes.
Figure 11:
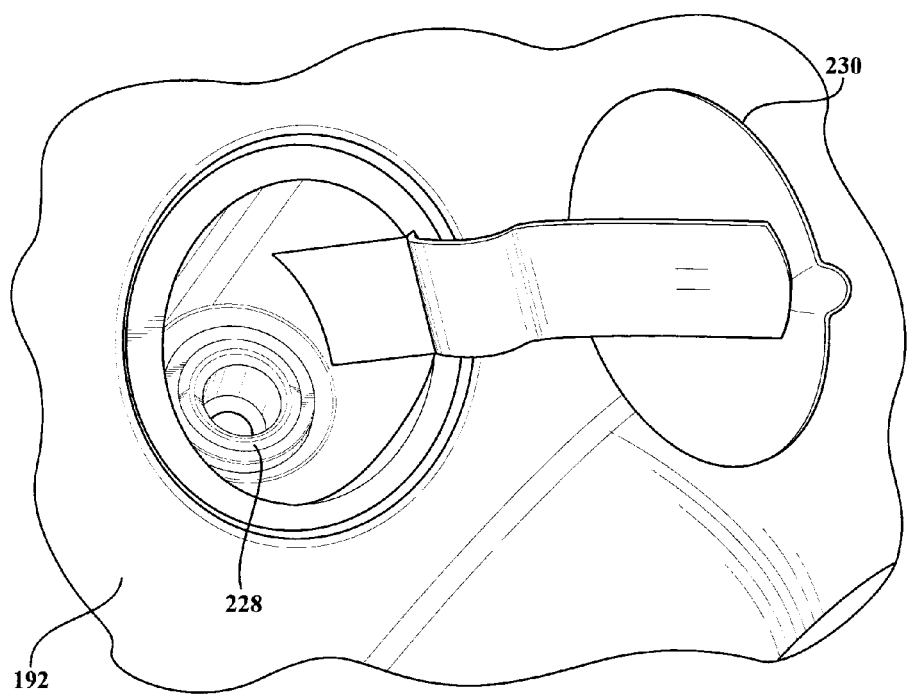
FIG. 11 is a perspective view of a cap less fueling assembly.

A seal 132, shown in FIG. 7, seals the space between the rectangular plenum tube 94 and the wall 72 of the fuel transfer housing 70. An alternate seal can be created by a flange 136 on the rectangular plenum tube 94 as shown in FIG. 9.

Figure 8:
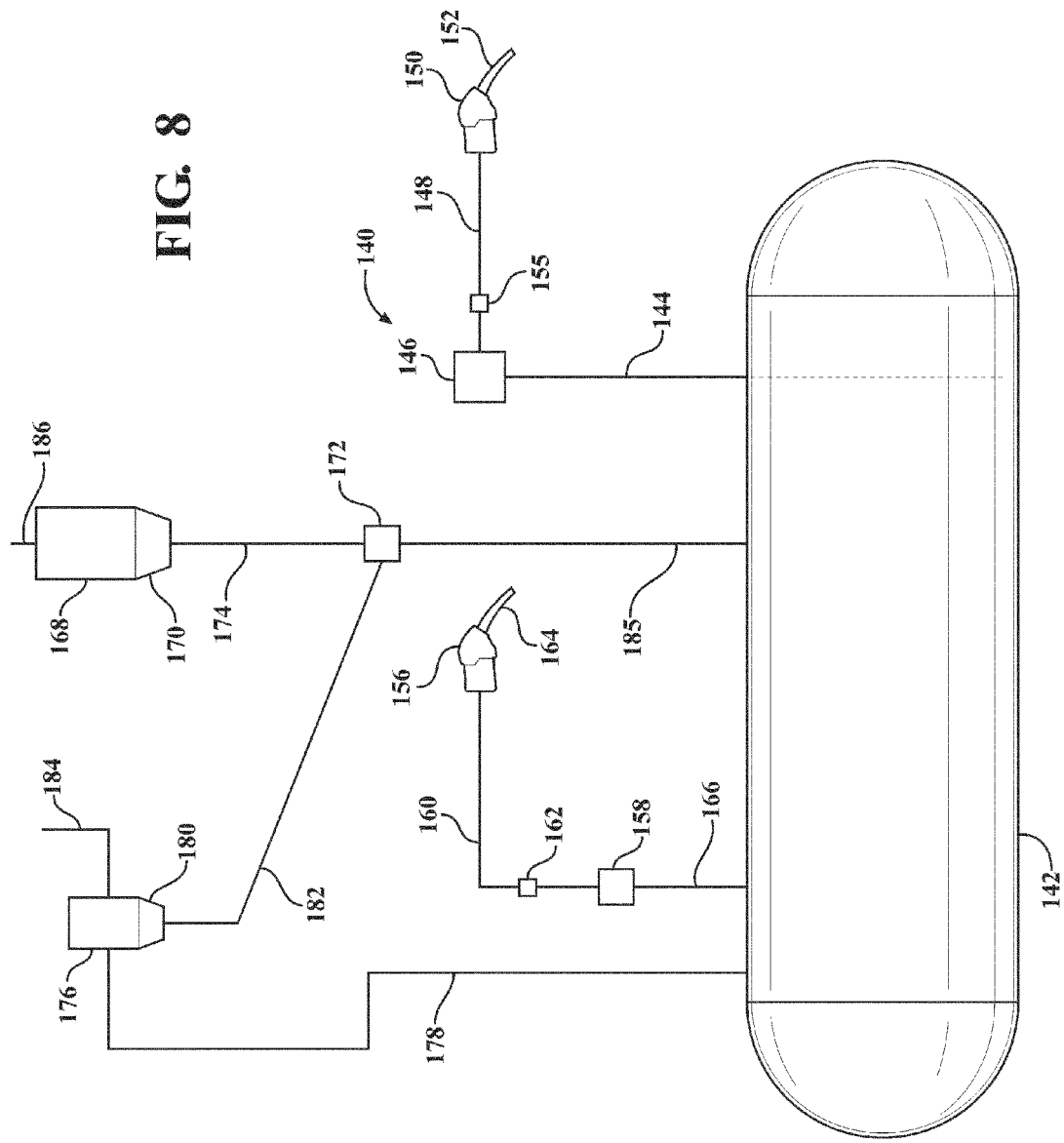
FIG. 8 is a schematic view of the fuel storage tank, the fuel supply system, the defueling system and the fuel vapor capture system.

The fuel transfer system 140 as shown in FIG. 8, includes a fuel storage tank 142. Fuel storage tanks 142 are generally underground. A fuel discharge pipe 144 extends from the tank 142 to a fuel pump 146. The pump 146 sucks fuel from the tank 142 and supplies the fuel to a flexible discharge hose 148. A discharge valve 150 with a discharge tube 152 is connected to the flexible hose 148. The discharge valve 150 includes a venturi shutoff that is activated when the fuel receiving tank 154 is full. The discharge valve 150 is a drip less valve with a venturi shutoff and machined parts manufactured by Husky Corporation of Pacific, Mo. and others. A quick disconnect 155 is provided in the flexible hose 148 to minimize damage and fuel loss if excess force is exerted on the hose.

A defueler valve 156 is connected to a suction pump 158 by a flexible hose 160. A quick disconnect 162 is provided in the flexible hose 160 to release the defueler valve 156 and a portion of the flexible hose if a tension load that is too large is exerted on the flexible hose. A defueler wand 164 made by Bennett Pump Company of Spring Lake, Mich. is connected to the defueler valve 156 and the suction pump 158 is delivered to the storage tank 142 by a pipe 166.

A fuel vapor separator 168 separates fuel from air and delivers the fuel from a collector tank 170 to a holding tank 172 through a fuel line 174. A second fuel vapor separator 176 separates fuel from air and fuel mixture received from a storage tank vent line 178. The separated fuel is collected in a collector tank 180. The separated fuel is transferred from the collector tank 180 to the holding tank 172 through a fuel line 182. Air separated from a mixture of air and fuel from the storage tank vent line 178 is discharged to atmosphere through a clean air discharge pipe 184.

Fuel received in the holding tank 172 is measured and delivered to the storage tank 142 by an inlet line 185.

The fuel vapor separator 168 includes a substantial airflow fan that reduces pressure inside the fuel transfer housing 70. The reduced pressure draws air and fuel vapors through rectangular plenum tube 94. If the auxiliary plenum tube 130 is attached to the rectangular plenum tube 94, the reduced pressure inside the fuel transfer housing 70 draws air and fuel particles through the auxiliary plenum tube 130. The quantity of air that is drawn into the fuel transfer housing 70 must be increased to insure that all the fuel vapors from the vehicle fuel tank 154 are captured when the auxiliary plenum tube 130 is not employed. The quantity of air drawn into the fuel transfer housing 70 may be reduced somewhat when the auxiliary plenum tube 130 is employed. However, it may require more power to draw in air when the auxiliary plenum tube 130 is in use. Cleaned air from the fuel particle separator 168 is discharged from the fuel transfer housing 70 through a pipe 186.

All of the structure shown in FIG. 8, but the fuel storage tank 142 is preferably mounted in the fuel transfer housing 70.

A low frequency transmitter 190 is mounted on the windshield of a vehicle 192 that is to be serviced. The transmitter 190 emits a signal that is received by a receiver 194. The signal is transmitted to the controller 60. The signal provides information concerning the fuel needed, the location of the vehicle fuel port 88, the number of fuel tanks 154 and the type of fuel cap 240. With this information, the controller turns of a red light 196 and illuminates a green light 198. The green light indicates the proper fueling bay that is available. The vehicle 192 then proceeds to the proper bay for fueling. A pair of cameras 200 and 202 that are mounted in the upper corners of the rectangular plenum tube 94, as shown in FIG. 7. At least one camera 200 needs to have a clear view of a fuel cap 240 or a cap less fuel entry port 228. If the auxiliary plenum tube 130 is used, a camera may be mounted inside the auxiliary plenum tube. The cameras 200 and 202 must remain out of the path of movement of the robot 10 at all times. At least one of the cameras needs to be able to record the location and orientation of the vehicle fuel port 88 or 228 that is to be fueled. Apertures in the auxiliary plenum tube 130 may be helpful. A camera 204 can also be mounted any place on the front wall that provides a view of the fuel port 88. A camera may also be mounted on the robot 10.

A driver stops his vehicle when the control console 82 is adjacent to the driver's side window. The driver opens his window. The method of payment is entered by answering an inquiry on a display screen 206. A card identifying the name and address of the owner is inserted into a card reader slot 208. A customer vehicle number can be entered with the card. A credit card can be entered in the card reader slot 208. Paper money can be inserted into a money slot 210. Change can be issued through a money dispersing slot 212. Coins can be dispersed in a coin cup if needed. The fuel type and grade can be selected by activating one of a row of selection indicators 216. The control console 82 also has a receipt issuing slot 218. After all of the required selections have been made, the controller 60 turns on the fuel vapor separator 168 to lower air pressure in the fuel transfer housing 70.

The motors 118 are activated to advance the rectangular plenum tube 94 toward the vehicle fuel port 88. When the plenum tube 94 or the auxiliary plenum tube 130 is in the correct position relative to the fuel entry port 88, the motors 118 are turned off.

The pictures of the fuel entry port 88 or door 230 disclose what needs to be done and confirms information received. The robot 10 is activated to open a door 230 covering a cap less fuel tank. The robot 10 is activated to open the door 230 if there is such a door. The robot removes a fuel cap 240 if there is one and moves the cap to a location inside the fuel transfer housing 70. The robot 10 grasps the correct discharge valve 150 for the fuel to be dispensed, moves the fuel discharge tube 152 into the fuel entry port 88 and opens the discharge valve 150. When the valve 150 is closed, because the fuel tank is full or the requested quantity of fuel has been dispensed, the robot returns the discharge valve 150 to the correct position in the fuel transfer housing 70. The fuel cap 240 is retrieved by the robot 10, from the place it was stored and replaced back in a closed position. An open door 230 is closed, if there was such a door, and the robot 10 returns to a rest position. The motors 118 are energized to retract the rectangular plenum tube 94 and the auxiliary plenum tube 130 if employed.

The fuel vapor separator 168 continues to run for a fixed period of time until the fuel transfers housing 70 is clear of vapors.

The control console 82 prints a receipt. The green light 198 is then illuminated indicating that the robot 10 is ready to fuel another vehicle.

Figure 5:
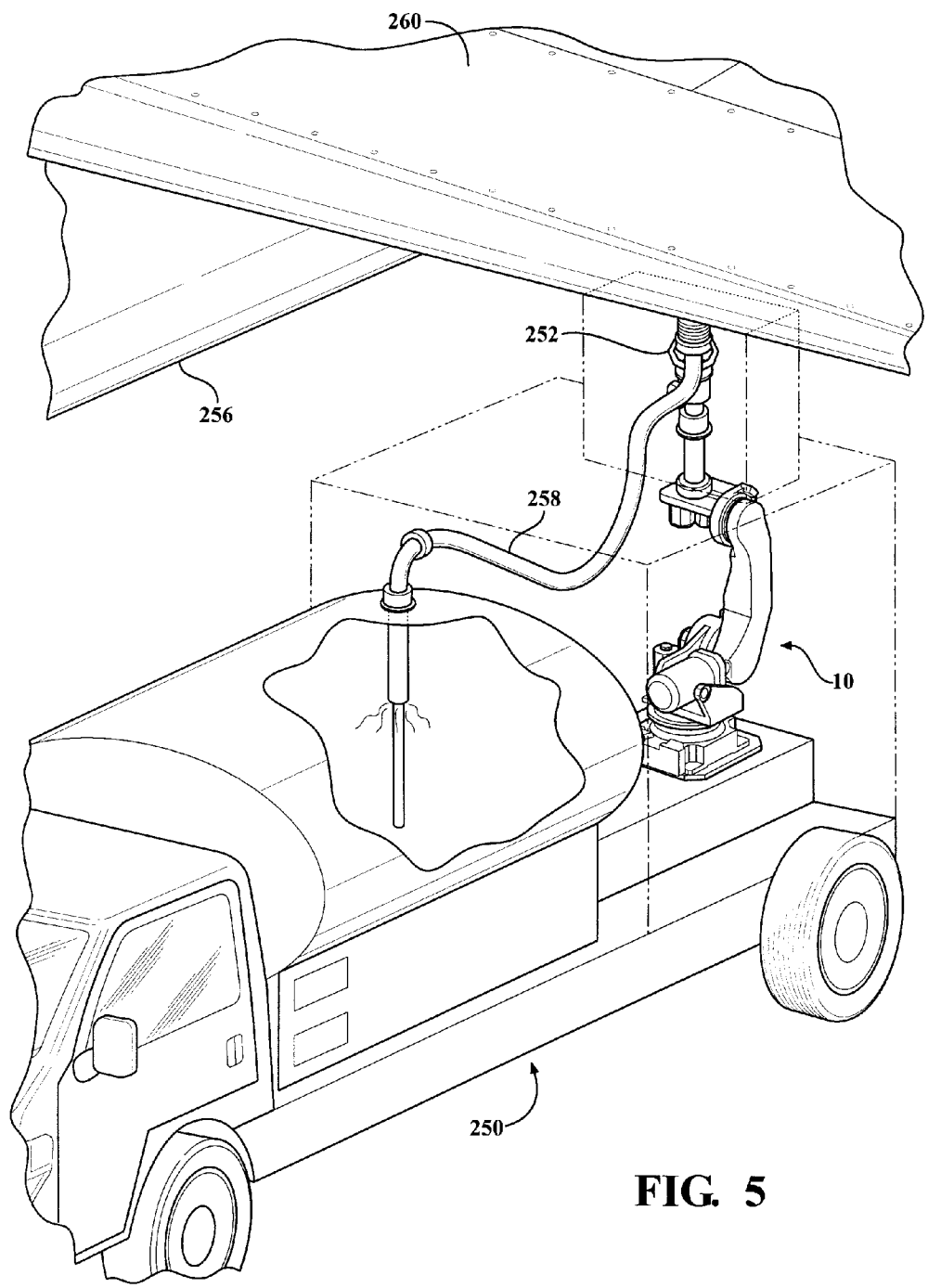
FIG. 5 is a perspective view of a mobile robot fueling an aircraft.

FIG. 5 shows the robot 10 on a fueling vehicle 250 and in position to fuel an aircraft 256. A cover on the bottom of the wing is opened by the robot 10 using cameras to locate and open the cover. A screw or cap for the fuel inlet is removed and stored by the robot 10. A fueling connector 252 together with the air and vapor return pipe 258 is lifted into engagement with the fuel inlet and rotated to a locked position. The robot 10 has a controller that is recognize when the fitting is properly seated. The robot 10 then pivots the air return fitting to lock the fitting in place. After the specified quantity of fuel has been pumped into the fuel tank, the fittings are both unlocked and lowered to a storage place. The inside caps are retrieved and screwed onto the two pipes by the robot. The cover on the bottom of the wing is returned to a closed position and retainers are moved to locked positions. The robot is then ready to move to another aircraft for fueling.

Figure 6:
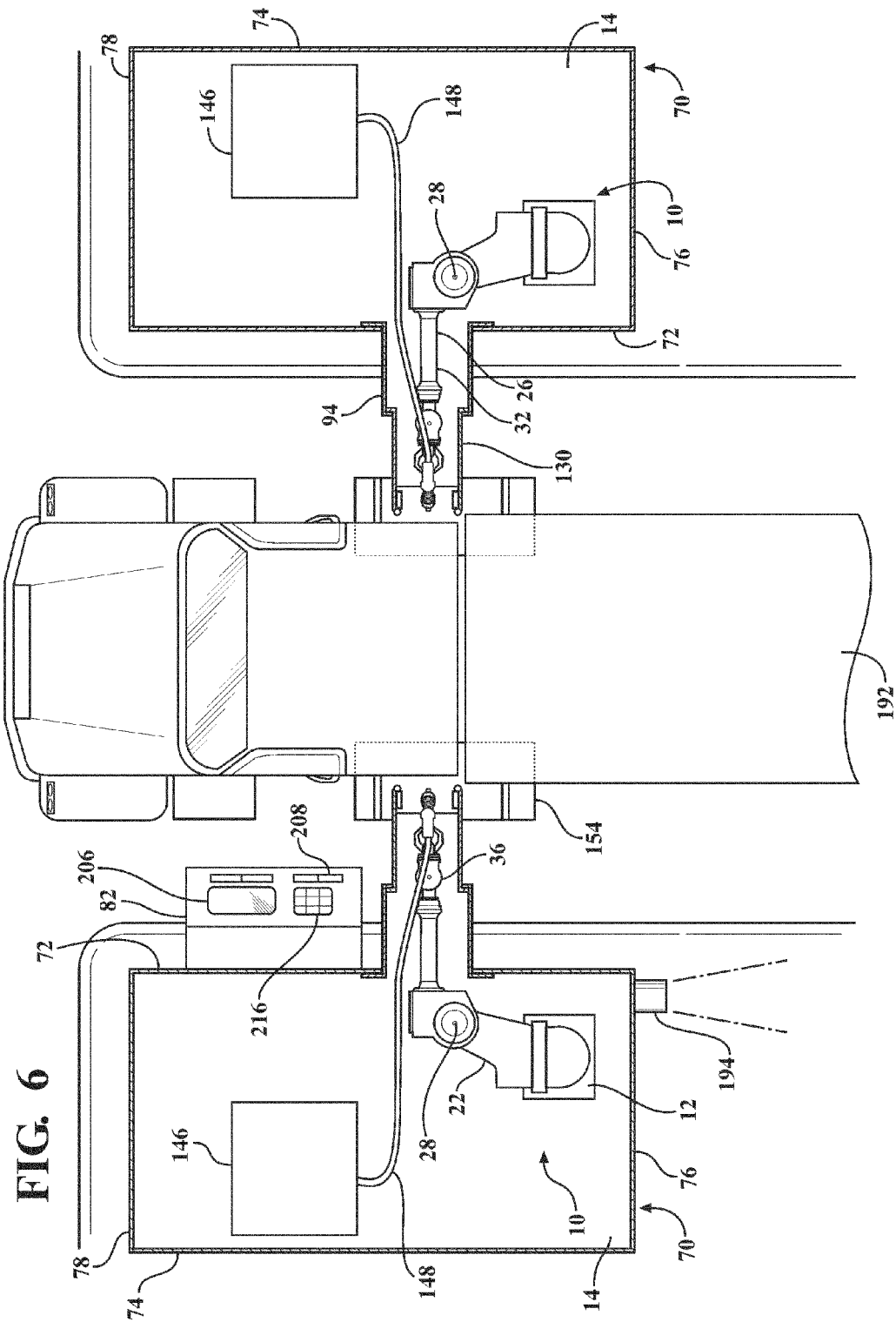
FIG. 6 is a top plan schematic view of the truck of FIG. 2 being fueled with parts broken away.

FIG. 6 shows two fueling robots 10. The pivot axis 28, about which the second arm assembly 26 pivots relative to the first arm 22, is vertical as shown. With the programmable controller controlling the movements of the robot 10, the orientation of the robot.

I claim:

1. An automated vehicle fueling apparatus comprising:
   a fuel transfer housing mounted adjacent to a vehicle lane;
   a fuel storage tank connected to the fuel transfer housing by a fixed fuel discharge pipe;
   a plenum tube supported for movement in a fuel transfer opening through a front wall of the fuel transfer housing, and a tube motor connected to the plenum tube and operable to move the plenum tube between a tube fueling position extending out of the fuel transfer housing and into the vehicle lane and a tube retracted position extending inside the fuel transfer housing and out of the vehicle lane;

a robot mounted inside the fuel transfer housing and having a tool end assembly and operable to extend the tool end assembly through the plenum tube and into the vehicle lane;

a programmable controller connected to the robot and operable to control movement of the tool end assembly;

a control console positioned adjacent to the vehicle lane, connected to the programmable controller, and having at least one information receiving member that is reachable from a vehicle operator's station when a vehicle is in the vehicle lane and in a vehicle fueling position;

at least two cameras connected to the programmable controller and positioned to view a fuel cap, on a fuel receiving tank of the vehicle, and guide the tool end assembly to a position for removing the fuel cap, and wherein the programmable controller activates the robot to remove the fuel cap, moves the fuel cap to a fuel cap storage location, moves a fuel discharge tube, connected to a fuel discharge valve and the fuel discharge pipe, into a fuel entry port in the fuel receiving tank, and opens the fuel discharge valve to dispense fuel into the fuel receiving tank;

an air and fuel vapor separator mounted in said fuel transfer housing and including an air flow fan that draws air and fuel vapors from the fuel receiving tank, through the plenum tube, into said fuel transfer housing and into the air and fuel vapor separator where fuel and fuel vapors are collected and cleaned air is discharged from said fuel transfer housing through a clean air discharge passage from the fuel transfer housing through a clean air discharge pipe;

wherein the programmable controller activates the robot to remove the fuel discharge tube from the fuel entry port in the fuel receiving tank after the fuel discharge valve is closed, moves the fuel discharge tube to a fuel discharge pipe storage location, retrieves the fuel cap from the fuel cap storage location, returns the fuel cap to the fuel entry port, close the fuel entry port and retracts the robot to a robot rest position; and wherein the plenum tube is moved to the tube retracted position by the tube motor.

2. An automated vehicle fueling apparatus comprising:
a fuel transfer housing mounted adjacent to a vehicle lane;
a fuel storage tank connected to the fuel transfer housing by a fixed fuel discharge pipe;
a plenum tube supported for movement in a fuel transfer opening through a front wall of the fuel transfer housing, and a tube motor connected to the plenum tube and operable to move the plenum tube between a tube fueling position extending out of the fuel transfer housing and into the vehicle lane and a tube retracted position extending inside the fuel transfer housing and out of the vehicle lane;
a multi axis robot mounted inside the fuel transfer housing and having a tool end assembly on an end of at least two arms, and a plurality of robot motors that are operable to extend the tool end assembly through the plenum tube and into the vehicle lane;
a programmable controller connected to the multi axis robot and operable to control movement of the tool end assembly by the plurality of robot motors;
a control console positioned adjacent to the vehicle lane, connected to the programmable controller, and having at least one information receiving member that is reachable from a vehicle operator's station when a vehicle is in the vehicle lane and in a vehicle fueling position;
at least two cameras connected to the programmable controller and positioned to view a fuel cap, on a fuel receiving tank of the vehicle, and guide the tool end assembly to a position for removing the fuel cap, and wherein the programmable controller activates the robot to remove the fuel cap, moves the fuel cap to a fuel cap storage location, moves a fuel discharge tube, connected to a fuel discharge valve and the fuel discharge pipe, into a fuel entry port in the fuel receiving tank, and opens the fuel discharge valve to dispense fuel into the fuel receiving tank;
an air and fuel vapor separator mounted in said fuel transfer housing and including an air flow fan that draws air and fuel vapors from the fuel receiving tank, through the plenum tube, into said fuel transfer housing and into the air and fuel vapor separator where fuel and fuel vapors are collected and cleaned air is discharged from said fuel transfer housing through a clean air discharge pipe;
wherein the programmable controller activates the robot to remove the fuel discharge tube from the fuel entry port in the fuel receiving tank after the fuel discharge valve is closed, moves the fuel discharge tube to a fuel discharge pipe storage location, retrieves the fuel cap from the fuel cap storage location, returns the fuel cap to the fuel entry port, close the fuel entry port and retracts the robot to a robot rest position; and
wherein the plenum tube is moved to the tube retracted position by the tube motor.

3. An automated vehicle fueling apparatus, as set forth in claim 2, wherein the plenum tube is supported for horizontal movement by rollers.

4. An automated vehicle fueling apparatus, as set forth in claim 2, wherein the plenum tube includes an outer plenum tube portion that telescopically receives an auxiliary plenum tube and the auxiliary plenum tube end facing away from the fuel transfer housing supports attached seal members that engage the vehicle during fueling.

5. An automated vehicle fueling apparatus, as set forth in claim 2, wherein the multi axis robot has at least six axes and the plurality of robot motors includes at least six reversible electric motors.

6. An automated vehicle fueling apparatus, as set forth in claim 2, wherein the control console is attached to the fuel transfer housing and is spaced from the fuel transfer opening a selected distance to align the fuel entry port of the vehicle with the fuel transfer opening when the vehicle operator's station is aligned with the control console.

7. An automated vehicle fueling apparatus, as set forth in claim 2, including a low frequency transmitter attached to the vehicle to be fueled that transmits identification information identifying the vehicle, a fuel type used by the vehicle, the location and number of the fuel receiving tanks;
a receiver that receives the information from the low frequency transmitter; and
a message transmitter that indicates the fuel transfer housing that is available to fuel the vehicle.

8. An automated vehicle fueling apparatus, as set forth in claim 2, wherein the plenum tube has vertical and horizontal space to accommodate movement of the tool end assembly to the fuel cap in a fuel cap range of positions.

9. An automated vehicle fueling apparatus, as set forth in claim 2, wherein the at least one information receiving member of the control console includes a card reader slot, a display screen, instruction input members and a receipt issue slot.

10. An automated vehicle fueling apparatus, as set forth in claim 9, wherein the control console includes a currency receiving slot and a currency dispensing slot.

11. An automated vehicle fueling apparatus, as set forth in claim 2, wherein the at least two cameras include a pair of cameras mounted inside the plenum tube supported for movement in the fuel transfer opening.

12. An automated vehicle fueling apparatus, as set forth in claim 11, including a third camera mounted on the fuel transfer housing in a third camera position spaced from the fuel transfer opening.

13. An automated vehicle fueling apparatus, as set forth in claim 2, including a fuel pump mounted in the fuel transfer housing, connected to the fuel discharge pipe, and to the fuel discharge tube.

14. An automated vehicle fueling method comprising:
receiving a signal, from a vehicle to be fueled, identifying a vehicle model to be fueled;
sending the vehicle model to be fueled to a programmable controller;
sending a signal identifying a fuel transfer housing to be used;
moving the vehicle to be fueled into a fueling lane adjacent the fuel transfer housing to be used;
stopping the vehicle to be fueled with an operator's station positioned adjacent to a control console that is engageable from the operator's station;
transferring information including fuel to be supplied, vehicle identification, and method of payment to the control console;
transferring information from the control console to the programmable controller;
energizing a motor to move a plenum tube telescopically relative to a fuel transfer opening in the fuel transfer housing and to a plenum tube position extending into the fueling lane;
activating a camera to locate a fuel cap and determine a fuel cap orientation and transferring the location of the fuel cap and the fuel cap orientation to the programmable controller;
energizing a fuel vapor separator to draw air and fuel vapors through said plenum tube and into the fuel transfer housing;
energizing a robot to remove the fuel cap, and moving the fuel cap to a storage position;
energize the robot to retrieve a fuel discharge tube from the fuel transfer housing;
moving the fuel discharge tube through said plenum tube and into a fuel entry port in a fuel receiving tank mounted on the vehicle to be fueled;
energizing a fuel pump to move fuel from a fuel storage tank through a fuel discharge pipe, a flexible discharge hose, a discharge valve, the fuel discharge tube and into the fuel receiving tank;
closing the discharge valve when the desired quantity of fuel is in the fuel receiving tank;
energizing the robot to move the fuel discharge tube from the fuel entry port, through said plenum tube and into the fuel transfer housing;
energizing the robot to retrieve the fuel cap, move the fuel cap through said plenum tube and replace the fuel cap on the fuel receiving tank;
energize the robot to move to a starting position in the fuel transfer housing;
separating fuel and fuel vapors from air drawn through said plenum tube and discharge cleaned air from the fuel transfer housing;
energizing the motor to retract said plenum tube from the fueling lane;
releasing the vehicle to be fueled to move from the fueling lane;
de-energizing the fuel vapor separator when the air in the fuel transfer housing is free of fuel and fuel vapors; and
returning captured fuel and fuel vapors from the fuel vapor separator to the fuel storage tank.

15. An automated vehicle fueling method, as set forth in claim 14 including:
energizing the robot, after the fuel cap is moved to a storage position, to retrieve a defueler wand from the fuel transfer housing;
moving the defueler wand through said tube and into the fuel entry port in the fuel receiving tank;
energizing a suction pump to suck fuel from the fuel receiving tank through the defueler wand, a defueler valve, a flexible hose, and return the fuel to the fuel storage tank.

* * * * *